United States Patent
Hippel et al.

(10) Patent No.: US 7,178,835 B2
(45) Date of Patent: Feb. 20, 2007

(54) BELT LOCKING DEVICE FOR A VEHICLE SEAT

(75) Inventors: Daniel Hippel, Winnweiler (DE); Michael König, Rodenbach (DE); Martin Reischmann, Hoehfroeschen (DE); Henning Schneider, Wolfstein (DE); Hans Edrich, Heltersberg (DE); Andreas Diehl, Otterbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/284,857

(22) Filed: Nov. 22, 2005

(65) Prior Publication Data
US 2006/0076767 A1   Apr. 13, 2006

Related U.S. Application Data

(63) Continuation of application No. PCT/EP04/05632, filed on May 26, 2004.

(30) Foreign Application Priority Data
Jun. 5, 2003   (DE) .................. 103 25 473

(51) Int. Cl.
*B60R 22/46* (2006.01)
(52) U.S. Cl. ...................................... 280/806
(58) Field of Classification Search ............. 280/801.1, 280/801.2, 806; 297/468, 480
See application file for complete search history.

(56) References Cited

U.S. PATENT DOCUMENTS

| | | | | |
|---|---|---|---|---|
| 3,957,281 A * | 5/1976 | Pech ............................ 297/470 |
| 4,999,004 A * | 3/1991 | Skanberg et al. ............ 297/480 |
| 5,149,128 A * | 9/1992 | Fohl .............................. 280/734 |
| 5,332,261 A * | 7/1994 | Siepierski ................. 280/801.1 |
| 5,364,129 A * | 11/1994 | Collins et al. .............. 280/806 |
| 5,519,997 A * | 5/1996 | Specht .......................... 60/632 |
| 5,564,748 A * | 10/1996 | Kmiec et al. ................ 280/806 |
| 5,607,185 A * | 3/1997 | Isaji et al. ................... 280/806 |
| 5,667,246 A * | 9/1997 | Miller, III .................... 280/806 |
| 5,692,805 A * | 12/1997 | Nishide et al. .............. 297/472 |
| 5,871,236 A * | 2/1999 | Bauer et al. ................. 280/806 |
| 5,879,027 A * | 3/1999 | Wier ............................ 280/806 |
| 5,887,897 A * | 3/1999 | Gill et al. .................... 280/806 |
| 6,076,856 A * | 6/2000 | Wang et al. ................. 280/806 |
| 6,485,058 B1 * | 11/2002 | Kohlndorfer et al. ....... 280/808 |
| 6,863,308 B2 * | 3/2005 | Motozawa ................... 280/806 |

(Continued)

FOREIGN PATENT DOCUMENTS

DE      30 44 834 A1    6/1982

(Continued)

*Primary Examiner*—Paul N. Dickson
*Assistant Examiner*—Laura B. Rosenberg
(74) *Attorney, Agent, or Firm*—Womble Carlyle Sandridge & Rice, PLLC

(57) ABSTRACT

In a belt locking device for a vehicle seat, in particular a motor vehicle seat, having a moveably attached belt lock (19), a tightening unit (13) supported on a structure-fixed support element (29), and a transmission element (21) acting between the tightening unit (13) and the belt lock (19), wherein, in the event of a crash, the tightening until (13) pulls the belt lock (19) from an initial position into a crash position by way of the transmission element (21), the position of the tightening unit (13) can be changed in a longitudinal direction of the transmission element (21) relative to the support element (29).

22 Claims, 3 Drawing Sheets

U.S. PATENT DOCUMENTS

| | | | |
|---|---|---|---|
| 6,869,104 B2 * | 3/2005 | Monroe ................... | 280/801.2 |
| 6,883,834 B2 * | 4/2005 | Grabowski et al. ...... | 280/801.2 |
| 6,932,324 B2 * | 8/2005 | Biller et al. ................ | 254/230 |
| 6,969,088 B2 * | 11/2005 | Wang ......................... | 280/802 |
| 6,976,707 B2 * | 12/2005 | Modinger et al. .......... | 280/806 |
| 2002/0043872 A1 * | 4/2002 | Townsend et al. .......... | 297/473 |
| 2002/0167212 A1 | 11/2002 | Rogers, Jr. et al. | |
| 2003/0075914 A1 | 4/2003 | Kohlndorfer et al. | |

FOREIGN PATENT DOCUMENTS

| | | |
|---|---|---|
| DE | 3734152 A1 * | 4/1989 |
| DE | 3822253 A1 * | 1/1990 |
| DE | 199 41 435 A1 | 4/2001 |
| JP | 05254394 A * | 10/1993 |

* cited by examiner

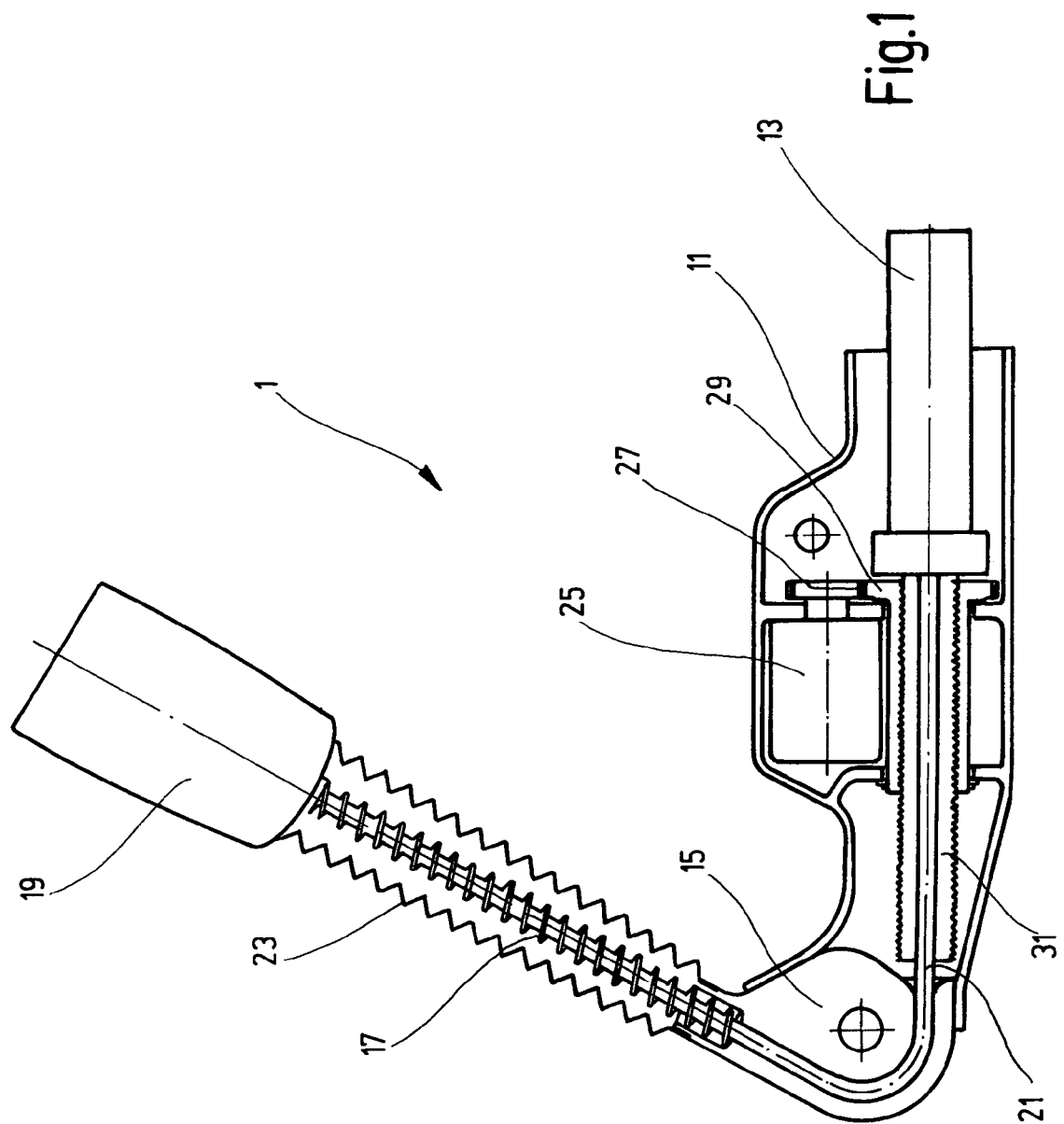

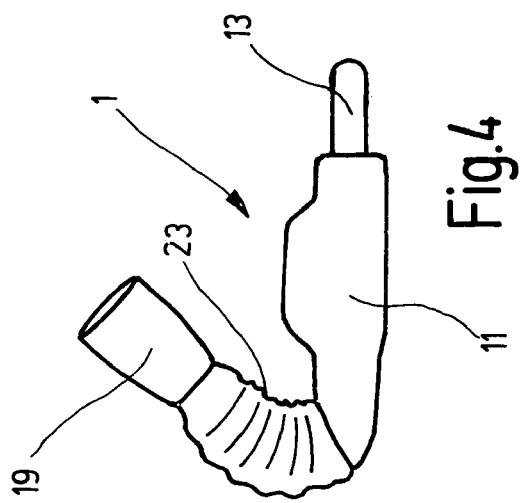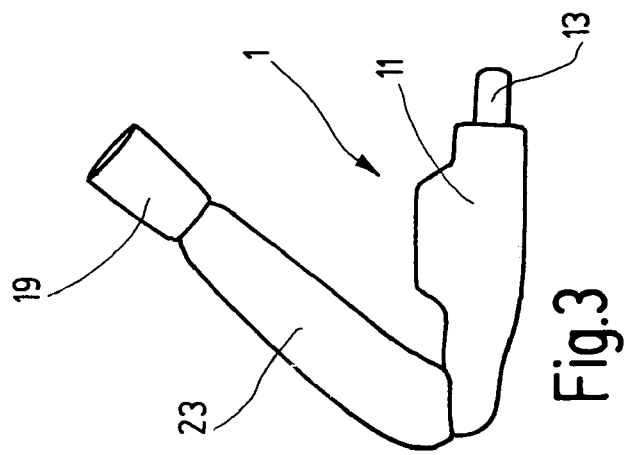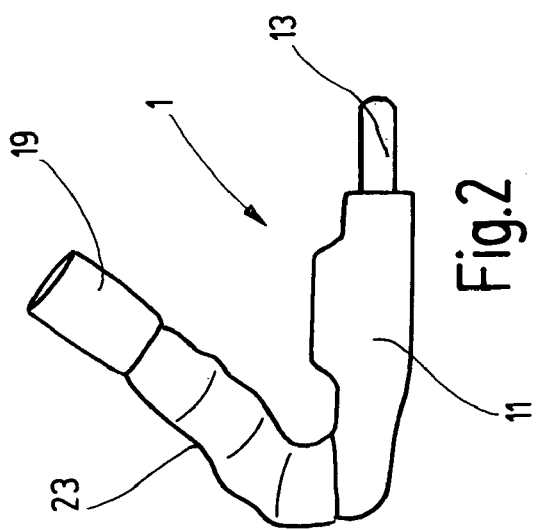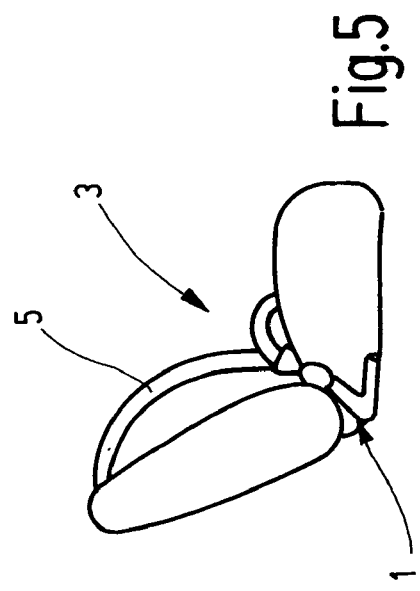

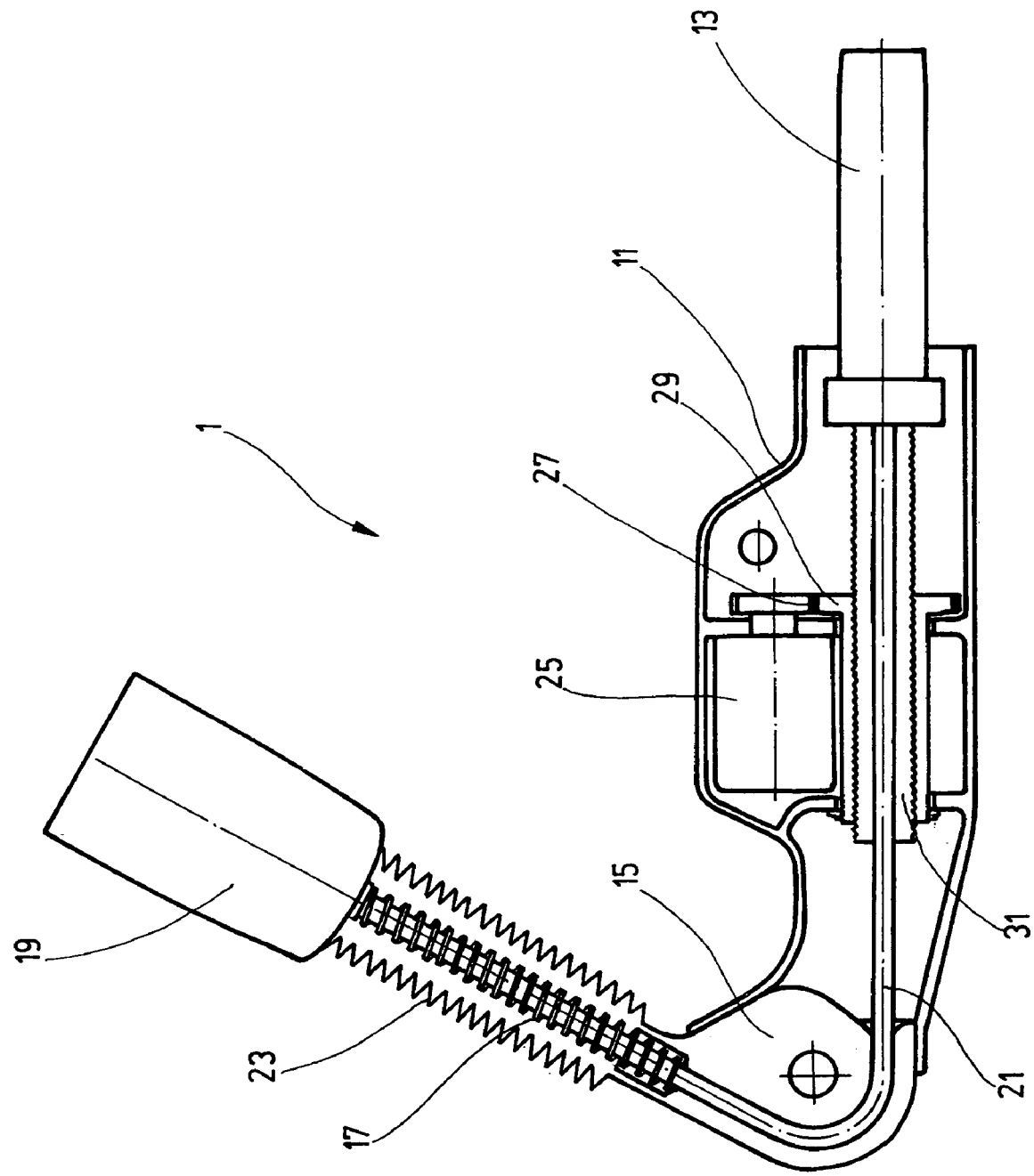

BELT LOCKING DEVICE FOR A VEHICLE SEAT

CROSS-REFERENCE TO RELATED APPLICATION

The present application is a continuation of International Application PCT/EP2004/005632, which was filed May 26, 2004. The entire disclosure of PCT/EP2004/005632, which was filed May 26, 2004, is incorporated herein by reference.

BACKGROUND OF THE INVENTION

The present invention relates to a belt locking device for a vehicle seat, in particular a motor vehicle seat, with the belt locking device having a moveably attached belt lock, a tightening unit supported on a structure-fixed support element, and a transmission means acting between the tightening unit and the belt lock, wherein, in the event of a crash, the tightening unit pulls the belt lock from an initial position into a crash position by means of the transmission means.

In a belt locking device of the type discussed immediately above, when there is a wide middle console between the vehicle seats, there exists the problem that a belt lock that is in a low position for optimum belt run can be poorly accessible.

BRIEF SUMMARY OF SOME ASPECTS OF THE INVENTION

An aspect of the present invention is the provision of improvements to a belt locking device of the type mentioned above. In accordance with one aspect of the present invention, a belt locking device for a vehicle seat, in particular a motor vehicle seat, has a moveably attached belt lock, a tightening unit supported on a structure-fixed support element, and a transmission means acting between the tightening unit and the belt lock, wherein, in the event of a crash, the tightening unit pulls the belt lock from an initial position into a crash position by means of the transmission means, and wherein the position of the tightening unit can be changed in a longitudinal direction of the transmission means relative to the support element.

By providing means to change the position of the tightening unit relative to the support element in the longitudinal direction of the transmission means, it is possible to provide, in addition to the belt tightening function, a comfort position that is more extended in comparison with the initial position of the belt lock, and in which the belt lock is more easily accessible. Once the passenger has put on the seatbelt, the belt lock returns to its initial position. By changing the position of the tightening unit, the belt lock is moved by means of the transmission means, i.e. the belt lock, tightening unit and support element are in series with respect to the force load occurring during tightening and when the belt is under functional load, i.e. a serial solution has been realized for both situations in which the belt is tightened (comfort and crash). As a rule, the transmission means is tension and pressure proof and flexible, with the option of a spring or another energy storage means keeping the belt lock in an upright position.

The position of the tightening unit can preferably be changed by means of a motor, i.e. the tightening unit is driven by a motor, on the one hand, in order to define a specific movement and, on the other hand, to increase comfort. To protect the support element of the tightening unit from dirt and damage, it is preferably located in a structure-fixed casing which also houses the motor and in which the belt lock is supported for example through a deflector and the spring. Fixing the casing to the structure can be realized with e.g. the seat frame, the upper rail, the lower rails or the vehicle structure.

In a preferred embodiment, the support element is in the form of a motor-driven rotatable spindle nut supported inside the casing, into which is screwed a spindle, the rotation of the motor being translated into a shifting of the tightening unit with simultaneous gear reduction. The spindle can be part of the tightening unit, i.e. of the tightening casing or, optionally, can be an independent element bearing against the tightening casing or being attached to it. In order to save construction space, the transmission means is preferably led through the spindle, which would then have to be hollow (e.g., define a passageway).

The invention is applicable to all vehicle seats having a belt tightener. Depending on the control and available sensors, different situations such as, for example, sitting down, opening the door, turning off the engine, or crash, may cause the comfort position to be assumed.

Other aspects and advantages of the present invention will become apparent from the following.

BRIEF DESCRIPTION OF THE DRAWINGS

The present invention is explained in more detail with reference to an exemplary embodiment which is illustrated in the drawings, in which:

FIG. 1 is a section through the exemplary embodiment in the comfort position, FIG. 2 is a lateral view of the exemplary embodiment in the initial position, FIG. 3 is a lateral view of the exemplary embodiment in the comfort position, FIG. 4 is a lateral view of the exemplary embodiment in the crash position, FIG. 5 is a schematic lateral view of a vehicle seat, and FIG. 6 is a section through the exemplary embodiment in the original position.

DETAILED DESCRIPTION OF THE EXEMPLARY EMBODIMENT

A belt locking device 1 for a vehicle seat 3 of a motor vehicle is fixed to the structure of the vehicle seat 3 on the side of the seat 3 that is adjacent to the vehicle's center tunnel. The purpose of the belt locking device 1 is to releasably attach a safety belt 5 of the vehicle seat 3. The arrangement of the vehicle seat 3 within the vehicle and the vehicle's normal direction of travel define the following directional indications. The belt locking device 1 has an oblong casing 11 whose longitudinal direction aligns with the direction of travel, and a pyrotechnical tightening unit 13 that is moveable in the direction of travel, is partly arranged inside the casing 11, and is otherwise protruding frontward. The belt locking device 1 furthermore has a deflector 15 arranged at the rear end of the casing 11, a spring 17 in the form of a helical spring pointing obliquely away from the deflector 15 frontward, and a belt lock 19 arranged at the upper end of the spring 17 for receiving the belt tongue of the safety belt 5.

A traction and pressure proof, flexible transmission means 21, in the present case a steel cable, is run from the tightening unit 13 backward and obliquely upward via the deflector and through the spring 17 towards the belt lock 19, and is attached to the belt lock 19. The transmission means 21 thus acts between the tightening unit 13 and the belt lock 19. The transmission means 21 is attached so that it can move in the longitudinal direction of the transmission means 21 relative to the casing 11, and flexibly transversally to the casing 11. The spring 17 is enclosed in bellows 23 that extends between the belt lock 19 and the deflector 15. The bellows 23 provides protection from dirt and other external effects. A motor 25 is supported in the casing 11. The motor 25 is in gear connection with a spindle nut 29 by means of a spur gear 27. The spindle nut 29 is screwed onto a non-rotating, hollow spindle 31 forming a rear part of the tightening unit 13 and through which the transmission means 21 is running towards the rear. The spindle nut 29, which is rotatably supported in the casing 11, acts as a support element for the tightening unit 13. In the initial position, the rear end of the spindle 31 is located at least approximately within the spindle nut 29.

In the event of a crash, the belt locking device 1 executes the known belt tightening function, i.e. the tightening unit 13 ignites and a part thereof rushes forward—supported on the part that is connected to the spindle 31 and pulling the belt lock 19 downward by means of the transmission means 21, against the force of the spring 17. This crash position is shown in FIG. 4. The safety belt 5 being locked in the belt lock 19 is tightened, i.e. a possible looseness in the belt is removed, so that the passenger is moved forward as little as possible.

The belt locking device 1 also has a comfort function because of a change in the position of the tightening unit 13. When a passenger sits down on the vehicle seat 3, this event being registered by the seat occupation recognition sensors, the motor 25 is activated, pushing the spindle 31 backward by means of the spindle nut 29. The tightening unit 13 that is carried along also moves the transmission means 21 backward, so that the spring 17 can use the freed path to extend the belt lock 19, as is shown in FIG. 3. The belt lock 19 thus becomes more easily accessible for the passenger. As soon as the safety belt 5 is completely buckled, the motor 25 moves the spindle 31 forward, i.e. it again pulls in the belt lock 19, until the optimal belt run is achieved and the looseness of the belt has been removed.

In a "postsafe"-able variation, after the crash the belt lock 19 is also brought into the comfort position by means of the motor 25, if this is still possible, in order to give rescuers easier access to the passenger.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A belt locking device that is for use with a vehicle seat and a safety belt, and that operates advantageously in response to both a crash and actions by a user of the vehicle seat, the belt lock device comprising:
    a tightening unit supported by a support element and operatively connected to a belt lock by way of a transmission means, wherein
        (a) the tightening unit is pyrotechnical and is thereby pyrotechnically operative for pulling the belt lock, by way of the transmission means moving relative to the support element, so that the belt lock moves from an initial position into a crash position in response to the crash, and
        (b) the tightening unit is mounted for moving
            (1) relative to the support element in a first direction, which extends in a longitudinal direction of the transmission means, so that the belt lock moves from the initial position to an extended position and the transmission means moves relative to the support element, and
            (2) relative to the support element in a second direction, which is opposite from the first direction, so that the tightening unit pulls the belt lock, by way of the transmission means moving relative to the support element, so that the belt lock moves from the extended position to the initial position; and
    a motor operatively associated with the tightening unit for
        (a) automatically moving the tightening unit relative to the support element in the first direction in response to the user sitting on the vehicle seat, so that the belt lock moves from the initial position to the extended position and the transmission means moves relative to the support element, and
        (b) automatically moving the tightening unit relative to the support element in the second direction in response to the safety belt being buckled to the belt lock, so that the tightening unit pulls the belt lock, by way of the transmission means moving relative to the support element, so that the belt lock moves from the extended position to the initial position,
    wherein the belt lock, the transmission means, the tightening unit and the support element are in series with respect to forces occurring while the transmission means is under tension.

2. The belt locking device according to claim 1, wherein the transmission means is tension stables, pressure stable, flexible, or any combination thereof.

3. The belt locking device according to claim 1, further comprising a casing that is for being fixedly mounted, wherein the support element is supported in the casing.

4. The belt locking device according to claim 3, wherein the motor is arranged inside the casing.

5. The belt locking device according to claim 1, further comprising a casing, wherein:
    the tightening unit includes a spindle,
    the support element is a spindle nut,
    the spindle nut is screwed onto the spindle, and
    said operative association between the motor and the tightening unit comprises the motor being operative for driving the spindle nut.

6. The belt locking device according to claim 5, wherein the spindle nut and the motor are arranged inside the casing.

7. The belt locking device according to claim 6, wherein the spindle nut is rotatably supported in the casing.

8. The belt locking device according to claim 5, wherein the spindle defines a passageway extending therethrough, and the transmission means extends through the passageway.

9. The belt locking device according to claim 5, wherein the spindle nut is rotatably supported in the casing.

10. The belt locking device according to claim 1, further comprising a casing and a spindle, wherein:
    the support element is a spindle nut,
    the spindle nut is screwed onto the spindle, and
    said operative association between the motor and the tightening unit comprises the motor being operative for driving the spindle nut.

11. The belt locking device according to claim 10, wherein said operative association between the motor and the tightening unit further comprises the spindle being operatively associated with the tightening unit for moving with the tightening unit in response to the motor driving the spindle nut.

12. The belt locking device according to claim 11, wherein the spindle nut is rotatably supported in the casing.

13. The belt locking device according to claim 10, wherein the spindle nut and the motor are arranged inside the casing.

14. The belt locking device according to claim 10, wherein the spindle defines a passageway extending therethrough, and the transmission means extends through the passageway.

15. The belt locking device according to claim 10, wherein the spindle nut is rotatably supported in the casing.

16. The belt locking device according to claim 1 in combination with the vehicle seat.

17. The combination according to claim 16, wherein the belt locking device further comprises a casing that is fixedly mounted to the vehicle seat, and the support element is supported in the casing.

18. The belt locking device according to claim 1, wherein the transmission means comprises a cable.

19. The belt locking device according to claim 1 in combination with the vehicle seat and the safety belt.

20. The belt locking device according to claim 1, wherein a spring biases the belt lock toward the extended position.

21. The belt locking device according to claim 1, wherein the initial position is between the crash position and the extended position.

22. The belt locking device according to claim 21, wherein the belt locking device is configured so that:

the belt lock moves downwardly while the belt lock moves from the extended position to the initial position, the belt lock moves downwardly while the belt lock moves from the initial position to the crash position, and the belt lock moves upwardly while the belt lock moves from the initial position to the extended position.

* * * * *